US010445081B2

(12) United States Patent
Christopher et al.

(10) Patent No.: US 10,445,081 B2
(45) Date of Patent: Oct. 15, 2019

(54) TECHNIQUES OF AUTOMATICALLY GENERATING DEPENDENCIES FOR APPLICATIONS IN EMBEDDED SYSTEMS

(71) Applicant: American Megatrends International, LLC, Norcross, GA (US)

(72) Inventors: Samvinesh Christopher, Suwanee, GA (US); Winston Thangapandian, Duluth, GA (US); Anurag Bhatia, Liburn, GA (US)

(73) Assignee: AMERICAN MEGATRENDS INTERNATIONAL, LLC, Norcross, GA (US)

( * ) Notice: Subject to any disclaimer, the term of this patent is extended or adjusted under 35 U.S.C. 154(b) by 422 days.

(21) Appl. No.: 15/222,557

(22) Filed: Jul. 28, 2016

(65) Prior Publication Data

US 2018/0032564 A1    Feb. 1, 2018

(51) Int. Cl.
*G06F 17/30* (2006.01)
*G06F 8/61* (2018.01)

(52) U.S. Cl.
CPC .................... *G06F 8/61* (2013.01)

(58) Field of Classification Search
CPC ........................................ G06F 8/61
See application file for complete search history.

(56) References Cited

U.S. PATENT DOCUMENTS

| 6,363,436 | B1* | 3/2002 | Hagy | G06F 9/44521 717/166 |
| 2003/0217065 | A1* | 11/2003 | Yokota | G06F 11/1433 |
| 2006/0149732 | A1* | 7/2006 | Huang | G06F 8/53 |
| 2008/0028395 | A1* | 1/2008 | Motta | G06F 8/65 717/177 |
| 2008/0092073 | A1* | 4/2008 | Shih | G06F 8/34 715/765 |
| 2010/0180265 | A1* | 7/2010 | Tsai | G06F 8/41 717/140 |
| 2011/0173604 | A1* | 7/2011 | Nakamura | G06F 8/63 717/173 |
| 2014/0282457 | A1* | 9/2014 | Chow | G06F 8/54 717/164 |
| 2016/0004545 | A1* | 1/2016 | Wang | G06F 8/41 719/327 |

* cited by examiner

*Primary Examiner* — Jared M Bibbee
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a management device. The management device obtains an organizational file of an executable program. The management device determines a list of libraries that are depended to execute the executable program. The management device obtains the list of libraries from one or more library collections. The library collections include at least one library that is not in the list of libraries. The management device constructs an embedded-system device with the executable program and the list of libraries without the at least one library.

20 Claims, 6 Drawing Sheets

TECHNIQUES OF AUTOMATICALLY GENERATING DEPENDENCIES FOR APPLICATIONS IN EMBEDDED SYSTEMS

BACKGROUND

Field

The present disclosure relates generally to embedded-system devices, and more particularly, to techniques of automatically generating library dependencies for an application executed on an embedded-system device.

Background

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, simple network management protocol (SNMP) traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

In desktops and servers, applications are provided in bundled packages that include the applications, depended files/libraries, documentations, and scripts and rules to install the applications. Once installed, most of the files may not be used at all, thus wasting resources. But embedded systems cannot afford wasting resources as the embedded systems have much lower memory, disk space, processing power compared to normal desktops/servers. Thus, there is a need to further improve resource usage efficiency for embedded-system devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a management device. The management device obtains an organizational file of an executable program. The management device determines a list of libraries that are depended to execute the executable program. The management device obtains the list of libraries from one or more library collections. The library collections include at least one library that is not in the list of libraries. The management device constructs an embedded-system device with the executable program and the list of libraries without the at least one library.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In desktops and servers, applications are provided in bundled packages which include the applications, depended files, documentations, and scripts and rules to install the applications. Once installed, most of the files may not be used at all, thus wasting resources. But embedded systems cannot afford wasting resources as the embedded systems have much lower memory, disk space, processing power compared to normal desktops/servers.

In certain circumstances, embedded-system developers may, from the bundles package, select the necessary files/libraries needed for running the systems and copy them to an embedded-system device. Since this is a manual process, there are often cases where depended tiles are missed from the system. The missing files may not be detected until a very late stage of development. The techniques described infra may automatically generate the list of depended files/libraries of an application. These techniques may eliminate some issues during development and may also reduce manual tasks performed by the developers.

Figure 1:
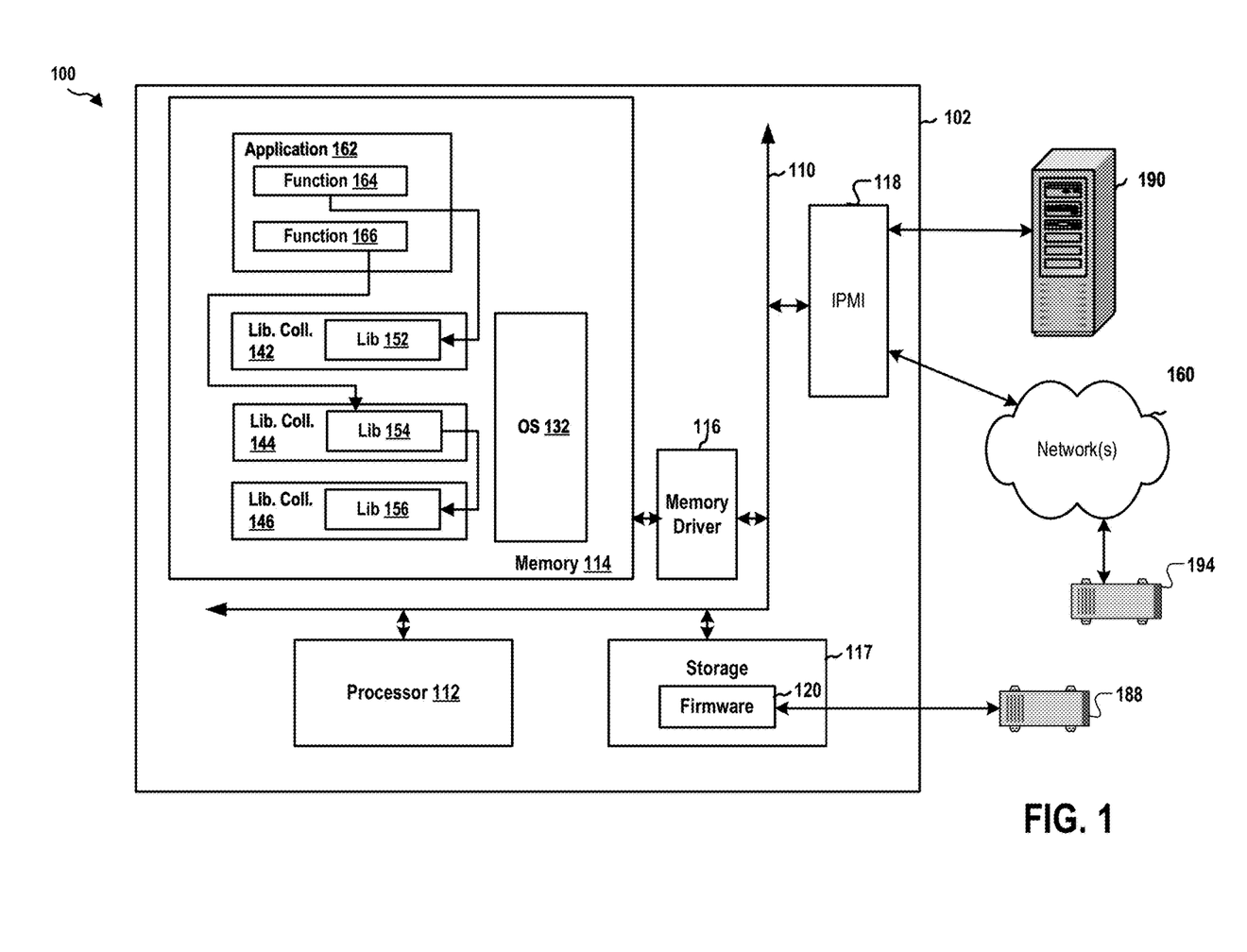
FIG. 1 is a diagram illustrating an embedded-system device and an installation agent.

FIG. 1 is a diagram 100 illustrating an embedded-system device and an installation agent. An embedded-system device 102 has a processor 112, a memory 114, a memory driver 116, and a storage 117. The embedded-system device 102 may support IPMI and may have an IPMI interface 118. For example, the embedded-system device 102 may be a baseboard management controller (BMC) that is in communication with, through the IPMI interface 118, a host computer 190 and/or a network device 194. The IPMI communication between the BMC and the network device 194 may be carried over a network 160. The BMC may manage the host computer 190.

Further, the storage 117 may store BMC firmware 120. When the processor 112 executes the BMC firmware 120, the processor 112 loads code and data of the BMC firmware 120 into the memory 114. This example shows that the BMC firmware 120 provides an (**operating system) OS 132, an application 162, and library collections 142, 144, 146 in the memory 114. Of course the memory 114 also contains other components of the embedded system.

The memory 114, the processor 112, the memory driver 116, the storage 117, and the IPMI interface 118 may be in communication with each other through a communication channel 110 such as a bus architecture.

The application 162 is executed with utilization of the OS 132 and the library collections 142, 144, 146. In particular, the application 162 has a function 164, which calls one or more functions of a library 152 of the library collection 142 during execution. The application 162 also has a function 166, which calls one or more functions of a library 154 of the library collection 144. Further, a function of the library 154 being called may in turn calls one or more functions of a library 156 of the library collection 146. These libraries may provide common functionalities (e.g., networking functionalities) that can be utilized by applications of the embedded-system device 102 such as the application 162.

Further, the libraries of the library collections 142, 144, 146 may be dynamic libraries or shared libraries, and may be linked to the application 162 dynamically during execution. In certain configurations, the program package of the application 162 does not contain the libraries 152, 154, 156. As such, the libraries 152, 154, 156 need to be copied to the BMC firmware 120 and installed on the OS 132 in order for the application 162 to be properly executed. In certain configurations, the program package of the application 162 may also include the libraries 152, 154, 156 in addition to the application 162.

In certain configurations, an installation agent 188 may be utilized to provide the libraries 152, 154, 156 depended by the application 162 for use with the application 162. The installation agent 188 may include the libraries 152, 154, 156 in the BMC firmware 120 when the program package of the application 162 does not include those libraries. Alternatively, the installation agent 188 may include the libraries 152, 154, 156 in the program package.

On one hand, the embedded-system device 102 has limited storage space and memory. On the other hand, the library collections 142, 144, 146 each may have a substantial amount of data and code. For example, the library collection 142 may be a graphic library collection and may have a relatively large size (e.g., 100 MB, 200 MB, or even more). Thus, as the application 162 may only call a small number (e.g., 1, 3, or 10) of libraries of the library collection 142, the libraries being called (depended) may have a relatively small size (e.g., 1 MB, 2 MB, or 5 MB). It is advantageous to include in the storage 117 only the libraries that are used/depended by the application 162 (rather than the entire library collection) in order to save resources of the embedded-system device 102.

Figure 2:
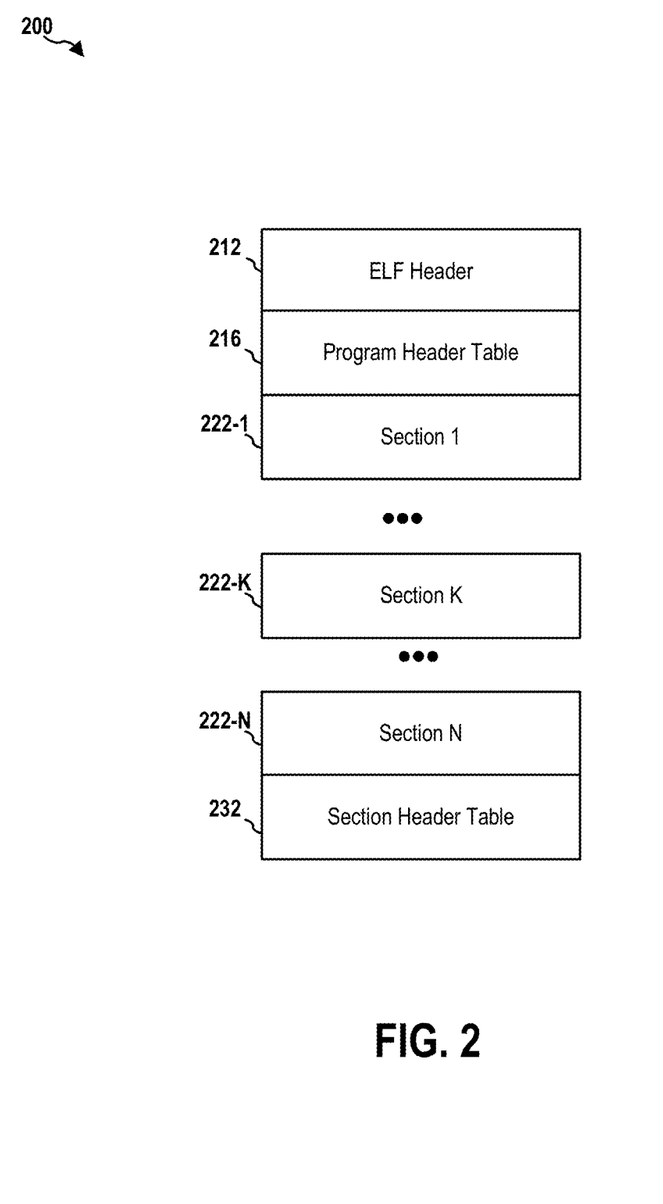
FIG. 2 is a diagram illustrating an organizational file.

In certain configurations, the application 162 may include an organizational file that includes a section indicating library dependency of the application 162. In particular, the organizational file may be an Executable and Linkable Format (ELF) file. FIG. 2 is a diagram illustrating an ELF file 200. The ELF file 200 includes an ELF header 212, an optional program header table 216, sections 1 to N 222-1 . . . 222-N, and a section header table 232. The ELF header 212 resides at the beginning of the ELF file 200 and holds a road map describing the file's organization. The sections 1 to N 222-1 . . . 222-N hold the bulk of object file information such as instructions, data, symbol table, relocation information. The program header table 216, if present, tells the system how to create a process image. The section header table 232 contains information describing the files sections. Every section has an entry in the table; each entry gives information such as the section name, the section size, etc.

Further, in this example, a section K 222-K is a dynamic section. The dynamic section provides information needed by the application 162 during runtime. In particular, the dynamic section has details about relocation and dynamic linking libraries. These dynamic linking libraries are the libraries which are needed for runtime.

The installation agent 188 may scan through the application 162 to locate the organizational file. For example, the installation agent 188 may find the organizational file by file name or file type. Further, in this example, the organizational file is the ELF file 200. The installation agent 188 may parse the ELF file 200 to locate the dynamic section of the ELF file 200, i.e., the section K 222-K. The installation agent 188 may find the location of the section K 222-K based on the information contained in the section header table 232. Then the installation agent 188 may read the section K 222-K to obtain indications (e.g., library names) of the libraries needed by the application 162. In this example, the installation agent 188 determines that the libraries 152, 154, 156 are needed by the application 162. The installation agent 188 itself may store, or may know a storage server that stores, copies of the library collections (e.g., the library collections 142, 144, 146) that contain the needed libraries. As such, in this example, the installation agent 188 obtains the libraries 152, 154, 156 from the library collections 142, 144, 146, respectively.

Subsequently, in certain configurations, the installation agent 188 may install only the needed libraries 152, 154, 156 of the library collections 142, 144, 146 in the BMC firmware 120 stored in the storage 117. In other words, the installation agent 188 do not install the library collections 142, 144, 146 in their entirety or substantial entirety on the BMC firmware 120. The installation agent 188 only installs the limited number of libraries (e.g., the libraries 152, 154, 156) that are needed by the application 162 during runtime. Each of the library collections 142, 144, 146 may have at least one other library in addition to the libraries 152, 154, 156, respectively, and those additional libraries are not installed or copied to the embedded-system device 102. By doing so, substantial resources are saved on the embedded-system device 102.

In certain configurations, instead of separately installing the needed libraries on the BMC firmware 120, the installation agent 188 may pack the needed libraries (e.g., the libraries 152, 154, 156) in the program package of the application 162. As such, the needed libraries may be installed on the embedded-system device 102 together with the application 162 at the same time.

Figure 3:
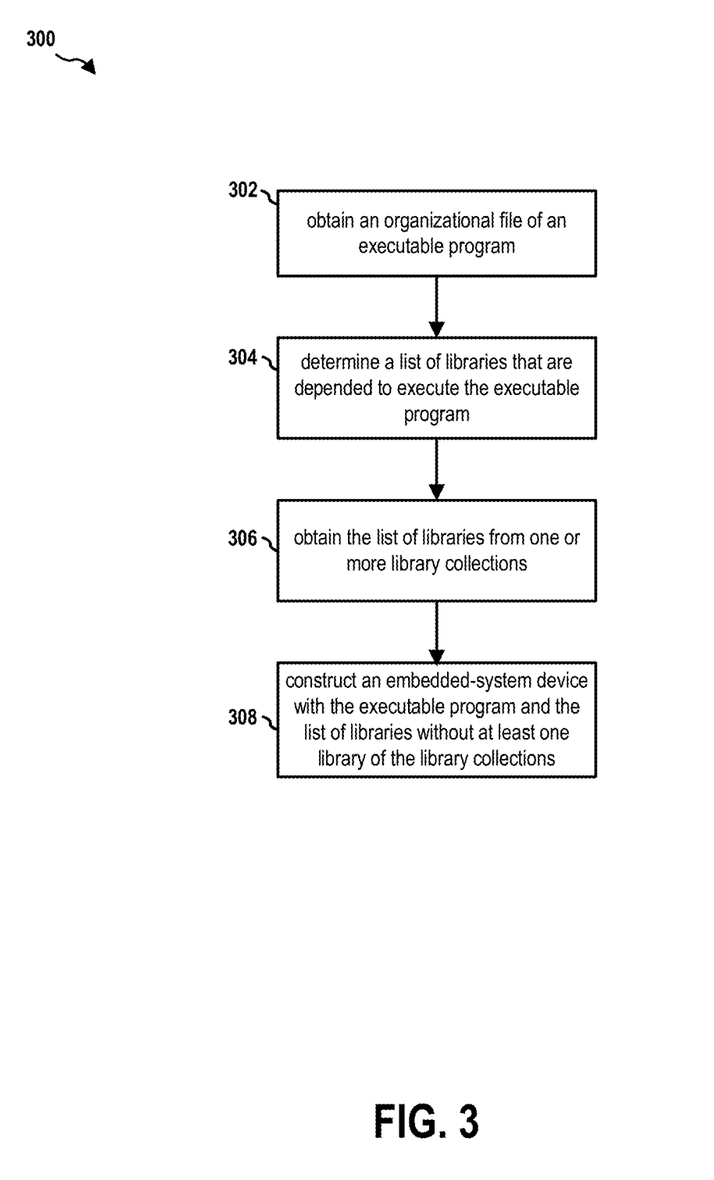
FIG. 3 is a flow chart of a method (process) for automatically generating library dependencies for an application.

FIG. 3 is a flow chart 300 of a method (process) for automatically generating library dependencies for an application. The method may be performed by a management device (e.g., the installation agent 188 and the apparatus 402/402').

At operation 302, the management device obtains an organizational file (e.g., the ELF file 200) of an executable program (e.g., the application 162). At operation 306, the management device determines a list of libraries (e.g., the libraries 152, 154, 156) that are depended to execute the executable program. At operation 308, the management device obtains the list of libraries from one or more library collections (e.g., the library collections 142, 144, 146). The library collections include at least one library that is not in the list of libraries. At operation 310, the management device constructs an embedded-system device (e.g., the embedded-system device 102 or the BMC firmware 120) with the executable program and the list of libraries without the at least one library.

In certain configurations, the organizational file is an Executable and Linkable Format (ELF) file. In certain configurations, each library of the list of libraries is a dynamic library. In certain configurations, each library collection of the one or more library collections includes a member library that is in the list of libraries. In certain configurations, the embedded-system device is constructed without installing the one or more library collections in entirety. In certain configurations, the obtaining the organizational file includes scanning the executable program to locate the organizational file. In certain configurations, the determining the list includes parsing the organizational file to locate a section indicating library dependency of the executable program. In certain configurations, the section indicating library dependency includes indications of dynamic libraries utilized by the executable program.

Figure 4:
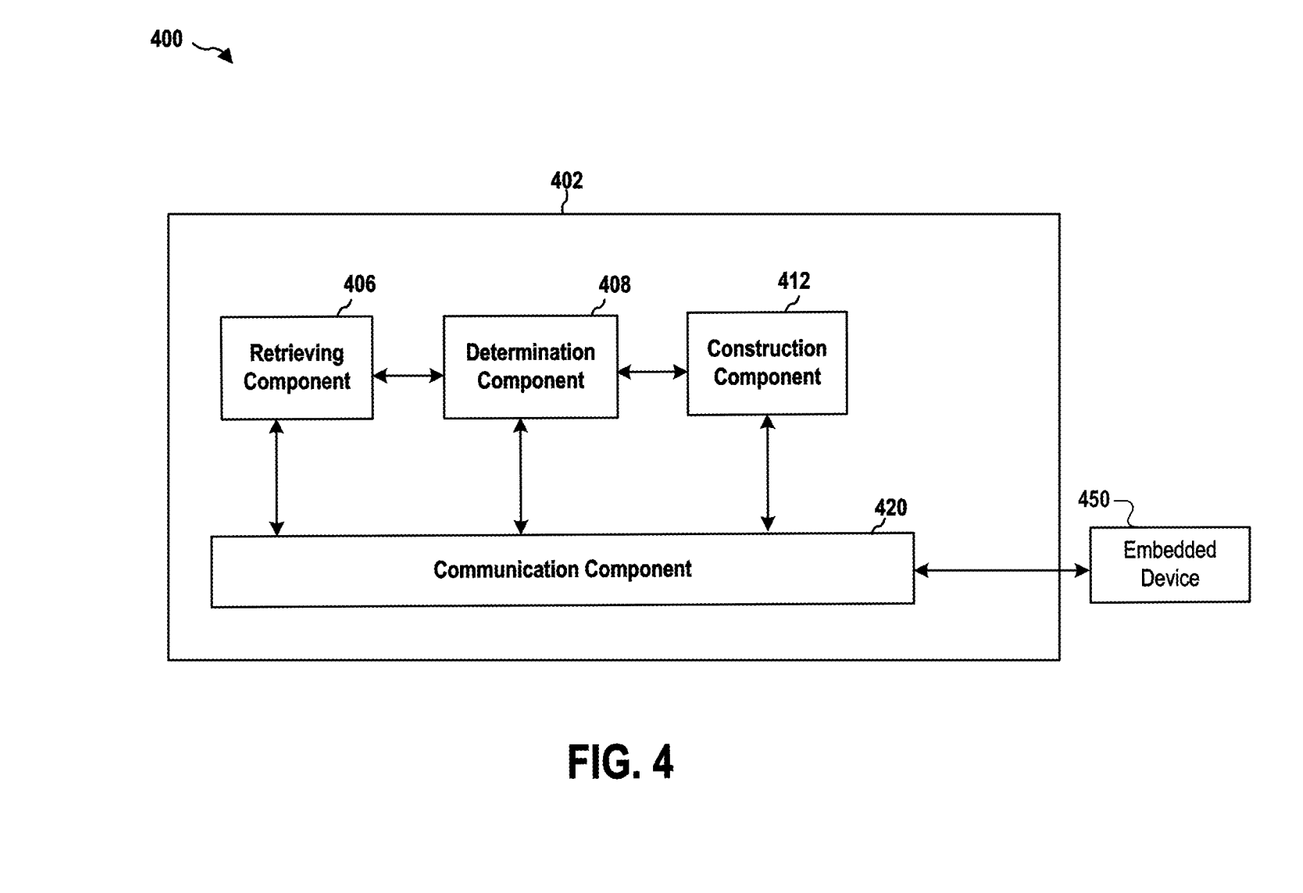
FIG. 4 is a conceptual data flow diagram illustrating the data flow between different means/components in an exemplary apparatus.

FIG. 4 is a conceptual data flow diagram 400 illustrating the data flow between different components/means in an exemplary apparatus 402. The apparatus 402 may be a management device (e.g., the installation agent 188). The apparatus 402 includes, among other components, a retrieving component 406, a determination component 408, and a construction component 412.

The retrieving component 406 obtains an organizational file of an executable program. The determination component 408 determines a list of libraries that are depended to execute the executable program. The retrieving component 406 obtains the list of libraries from one or more library collections. The library collections include at least one library that is not in the list of libraries. The construction component 412 constructs an embedded-system device 450 with the executable program and the list of libraries without the at least one library.

In certain configurations, the organizational file is an Executable and Linkable Format (ELF) file. In certain configurations, each library of the list of libraries is a dynamic library. In certain configurations, each library collection of the one or more library collections includes a member library that is in the list of libraries, In certain configurations, the embedded-system device 450 is constructed without installing the one or more library collections in entirety. In certain configurations, the obtaining the organizational file includes scanning the executable program to locate the organizational file. In certain configurations, the determining the list includes parsing the organizational file to locate a section indicating library dependency of the executable program. In certain configurations, the section indicating library dependency includes indications of dynamic libraries utilized by the executable program.

Figure 5:
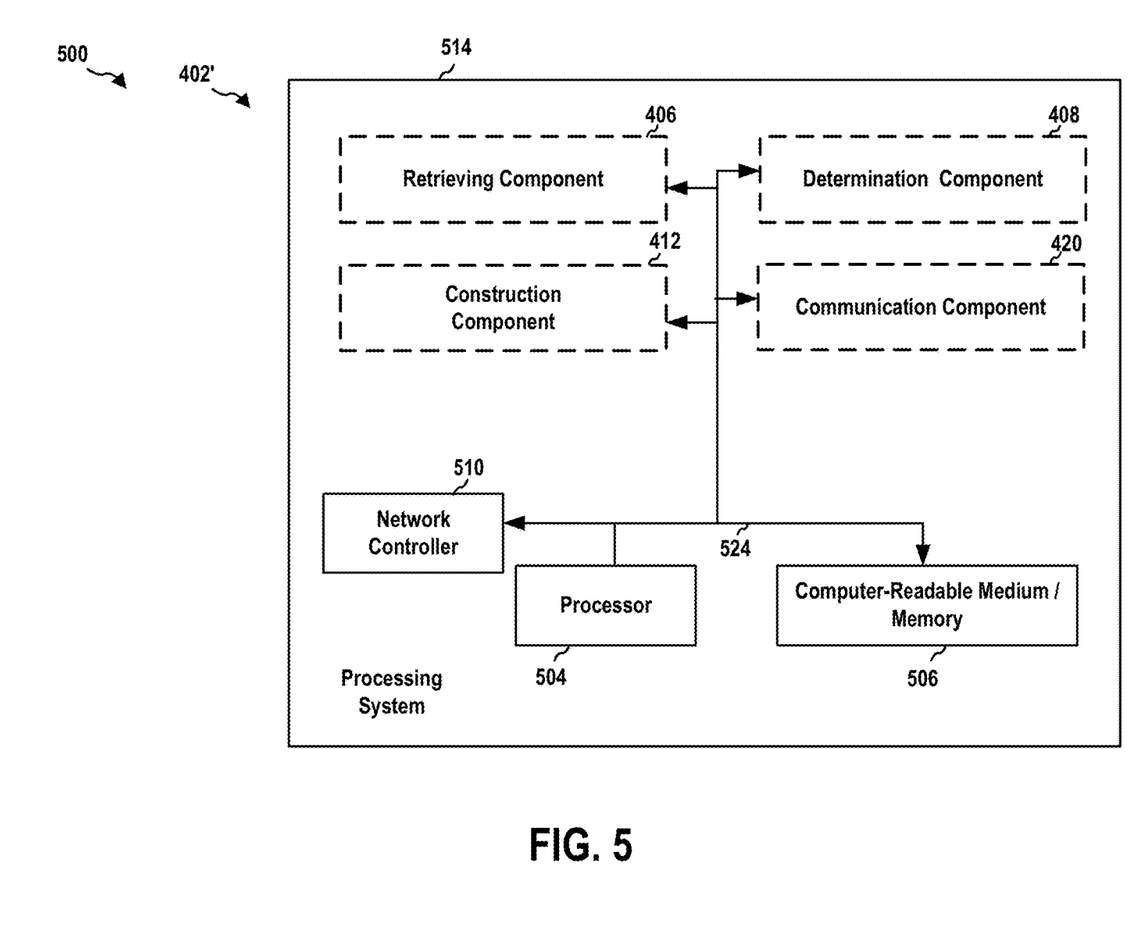
FIG. 5 is a diagram illustrating an example of a hardware implementation for an apparatus employing a processing system.

FIG. 5 is a diagram 500 illustrating an example of a hardware implementation for an apparatus 402' employing a processing system 514. The processing system 514 may be implemented with a bus architecture, represented generally by the bus 524. The bus 524 may include any number of interconnecting buses and bridges depending on the specific application of the processing system 514 and the overall design constraints. The bus 524 links together various circuits including one or more processors and/or hardware components, represented by the processor 504, the retrieving component 406, the determination component 408, the construction component 412, and the computer-readable medium/memory 506. The bus 524 may also link various other circuits such as timing sources, peripherals, voltage regulators, and power management circuits, which are well known in the art, and therefore, will not be described any further.

The processing system 514 may be coupled to a network controller 510. The network controller 510 provides a means for communicating with various other apparatus over a network. The network controller 510 receives a signal from the network, extracts information from the received signal, and provides the extracted information to the processing system 514, specifically the communication component 420. In addition, the network controller 510 receives information from the processing system 514, specifically the communication component 420, and based on the received information, generates a signal to be sent to the network. The processing system 514 includes a processor 504 coupled to a computer-readable medium/memory 506. The processor 504 is responsible for general processing, including the execution of software stored on the computer-readable medium/memory 506. The software, when executed by the processor 504, causes the processing system 514 to perform the various functions described supra for any particular apparatus. The computer-readable medium/memory 506 may also be used for storing data that is manipulated by the processor 504 when executing software. The processing system further includes at least one of the retrieving component 406, the determination component 408, the construction component 412. The components may be software components running in the processor 504, resident/stored in the computer readable medium/memory 506, one or more hardware components coupled to the processor 504, or some combination thereof.

The apparatus 402/402' may be configured to include means for performing each of the operations described supra referring to FIG. 3. The aforementioned means may be one or more of the aforementioned components of the apparatus 402 and/or the processing system 514 of the apparatus 402' configured to perform the functions recited by the aforementioned means.

Figure 6:
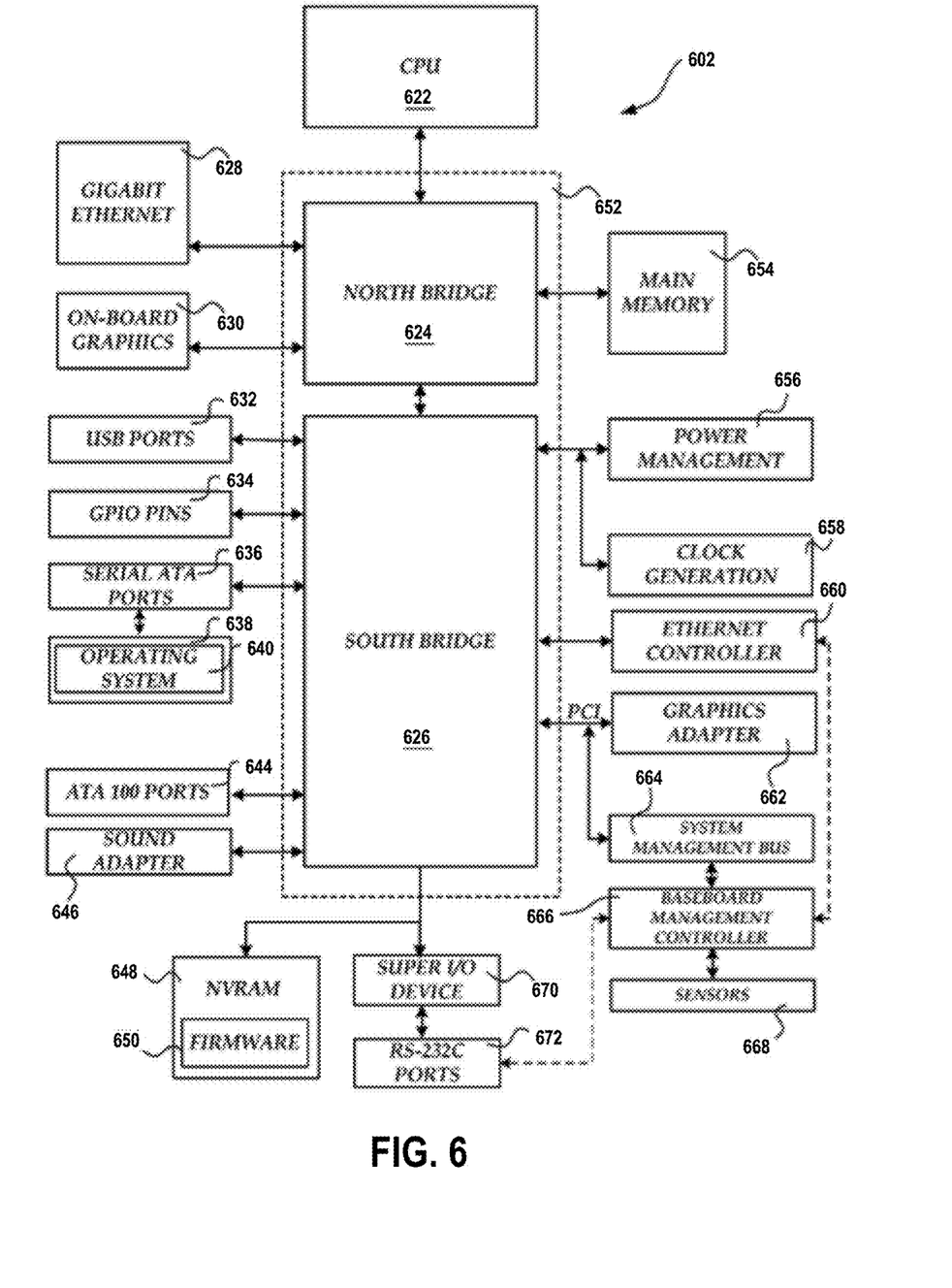
FIG. 6 shows a computer architecture for a computer.

FIG. 6 and the following discussion are intended to provide a brief, general description of one suitable computing environment in which aspects of the embodiments described herein may be implemented. In particular, FIG. 6 shows a computer architecture for a computer 602 that may be utilized to embody the host computer 190, as described supra. It should be appreciated that the computer architecture shown in FIG. 6 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 602 shown in FIG. 6 includes a baseboard, or "motherboard," which is a printed circuit board to which a multitude of components or devices may be connected by way of a system bus or other electrical communication path. In one illustrative embodiment, a CPU 622 operates in conjunction with a chipset 652. The CPU 622 is a standard central processor that performs arithmetic and logical operations necessary for the operation of the computer. The server computer 602 may include a multitude of CPUs 622.

The chipset 652 includes a north bridge 624 and a south bridge 626. The north bridge 624 provides an interface between the CPU 622 and the remainder of the computer 602. The north bridge 624 also provides an interface to a random access memory ("RAM") used as the main memory 654 in the computer 602 and, possibly, to an on-board graphics adapter 630. The north bridge 624 may also include functionality for providing networking functionality through a gigabit Ethernet adapter 628. The gigabit Ethernet adapter 628 is capable of connecting the computer 602 to another computer via a network. Connections which may be made by the network adapter 628 may include LAN or WAN connections. LAN and WAN networking environments are commonplace in offices, enterprise-wide computer networks, intranets, and the internet. The north bridge 624 is connected to the south bridge 626.

The south bridge 626 is responsible for controlling many of the input/output functions of the computer 602. In particular, the south bridge 626 may provide one or more USB ports 632, a sound adapter 646, an Ethernet controller 660, and one or more GPIO pins 634. The south bridge 626 may also provide a bus for interfacing peripheral card devices such as a graphics adapter 662. In one embodiment, the bus comprises a PCI bus. The south bridge 626 may also provide a system management bus 664 for use in managing the various components of the computer 602. Additional details regarding the operation of the system management bus 664 and its connected components are provided below.

The south bridge 626 is also operative to provide one or more interfaces for connecting mass storage devices to the computer 602. For instance, according to an embodiment, the south bridge 626 includes a serial advanced technology attachment ("SATA") adapter for providing one or more SATA ports 636 and an ATA 100 adapter for providing one or more ATA 100 ports 644. The SATA ports 636 and the ATA 100 ports 644 may be, in turn, connected to one or more mass storage devices such as the SATA disk drive 638 storing an operating system 640 and application programs.

As known to those skilled in the art, an operating system 640 comprises a set of programs that control operations of a computer and allocation of resources. An application program is software that runs on top of the operating system software, or other runtime environment, and uses computer resources to perform application specific tasks desired by the user. According to one embodiment of the invention, the operating system 640 comprises the LINUX operating system. According to another embodiment of the invention the operating system 640 comprises an operating system within the WINDOWS family of operating systems from MICROSOFT CORPORATION. According to another embodiment, the operating system 640 comprises the UNIX, LINUX, or SOLARIS operating system. It should be appreciated that other operating systems may also be utilized.

The mass storage devices connected to the south bridge 626, and their associated computer storage media, provide non-volatile storage for the computer 602. Although the description of computer storage media contained herein refers to a mass storage device, such as a hard disk or CD-ROM drive, it should be appreciated by those skilled in the art that computer storage media can be any available media that can be accessed by the computer 602.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 626 for connecting a "Super I/O" device 670. The Super I/O device 670 is responsible for providing a number of input/output ports, including a keyboard port, a mouse port, a serial interface 672, a parallel port, and other types of input/output ports. The LPC interface may also connect a computer storage media such as a ROM or a flash memory such as a NVRAM 648 for storing the firmware 650 that includes program code containing the basic routines that help to start up the computer 602 and to transfer information between elements within the computer 602.

As described briefly above, the south bridge 626 may include a system management bus 664. The system management bus 664 may include a BMC 666. The BMC 666 may be the embedded-system device 102. In general, the BMC 666 is a microcontroller that monitors operation of the computer system 602. In a more specific embodiment, the BMC 666 monitors health-related aspects associated with the computer system 602, such as, but not limited to, the temperature of one or more components of the computer system 602, speed of rotational components (e.g., spindle motor, CPU Fan, etc.) within the system, the voltage across or applied to one or more components within the system 602, and the available or used capacity of memory devices within the system 602. To accomplish these monitoring functions, the BMC 666 is communicatively connected to one or more components by way of the management bus 664. In an embodiment, these components include sensor devices 668 for measuring various operating and performance-related parameters within the computer system 602. The sensor devices 668 may be either hardware or software based components configured or programmed to measure or detect one or more of the various operating and performance-related parameters.

It should also be appreciated that the computer 602 may comprise other types of computing devices, including handheld computers, embedded computer systems, personal digital assistants, and other types of computing devices known to those skilled in the art. It is also contemplated that the computer 602 may not include all of the components shown in FIG. 6, may include other components that are not explicitly shown in FIG. 6, or may utilize an architecture completely different than that shown in FIG. 6.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of installing firmware to an embedded-system device, comprising:
    obtaining, at an installation device external to the embedded-system device, an organizational file of an executable program;
    determining, at the installation device, a list of libraries that are depended to execute the executable program;
    obtaining, at the installation device, the list of libraries from one or more library collections, the one or more library collections including at least one library that is not in the list of libraries;
    generating, at the installation device, firmware for the embedded-system device with the executable program and the list of libraries without the at least one library;
    installing the firmware from the installation device to a storage device of the embedded-system device, wherein the storage device is external to a primary memory of the embedded-system device, wherein a processing unit of the embedded-system device loads the executable program and the list of libraries from the storage device into the primary memory for execution.

2. The method of claim 1, wherein the organizational file is an Executable and Linkable Format (ELF) file.

3. The method of claim 1, wherein each library of the list of libraries is a dynamic library.

4. The method of claim 1, wherein each library collection of the one or more library collections includes a member library that is in the list of libraries, wherein the embedded-system device is constructed without installing the one or more library collections in entirety.

5. The method of claim 1, wherein the obtaining the organizational file includes scanning the executable program to locate the organizational file.

6. The method of claim 1, wherein the determining the list includes parsing the organizational file to locate a section indicating library dependency of the executable program.

7. The method of claim 6, wherein the section indicating library dependency includes indications of dynamic libraries utilized by the executable program.

8. An apparatus, the apparatus being an installation device external to an embedded-system device, comprising:
  a memory; and
  at least one processor coupled to the memory and configured to:
    obtain, at the installation device, an organizational file of an executable program;
    determine, at the installation device, a list of libraries that are depended to execute the executable program;
    obtain, at the installation device, the list of libraries from one or more library collections, the one or more library collections including at least one library that is not in the list of libraries;
    generate, at the installation device, firmware for the embedded-system device with the executable program and the list of libraries without the at least one library; and
    install the firmware from the installation device to a storage device of the embedded-system device, wherein the storage device is external to a primary memory of the embedded-system device, wherein a processing unit of the embedded-system device loads the executable program and the list of libraries from the storage device into the primary memory for execution.

9. The apparatus of claim 8, wherein the organizational file is an Executable and Linkable Format (ELF) file.

10. The apparatus of claim 8, wherein each library of the list of libraries is a dynamic library.

11. The apparatus of claim 8, wherein each library collection of the one or more library collections includes a member library that is in the list of libraries, wherein the embedded-system device is constructed without installing the one or more library collections in entirety.

12. The apparatus of claim 8, wherein the obtaining the organizational file includes scanning the executable program to locate the organizational file.

13. The apparatus of claim 8, wherein the determining the list includes parsing the organizational file to locate a section indicating library dependency of the executable program.

14. The apparatus of claim 13, wherein the section indicating library dependency includes indications of dynamic libraries utilized by the executable program.

15. A non-transitory computer-readable medium storing computer executable code for operating an installation device external to an embedded-system device, comprising code to:
  obtain, at the installation device, an organizational file of an executable program;
  determine, at the installation device, a list of libraries that are depended to execute the executable program;
  obtain, at the installation device, the list of libraries from one or more library collections, the one or more library collections including at least one library that is not in the list of libraries;
  generate, at the installation device, firmware for the embedded-system device with the executable program and the list of libraries without the at least one library; and
  install the firmware from the installation device to a storage device of the embedded-system device, wherein the storage device is external to a primary memory of the embedded-system device, wherein a processing unit of the embedded-system device loads the executable program and the list of libraries from the storage device into the primary memory for execution.

16. The non-transitory computer-readable medium of claim 15, wherein the organizational file is an Executable and Linkable Format (ELF) file.

17. The non-transitory computer-readable medium of claim 15, wherein each library of the list of libraries is a dynamic library.

18. The non-transitory computer-readable medium of claim 15, wherein each library collection of the one or more library collections includes a member library that is in the list of libraries, wherein the embedded-system device is constructed without installing the one or more library collections in entirety.

19. The non-transitory computer-readable medium of claim 15, wherein the obtaining the organizational file includes scanning the executable program to locate the organizational file.

20. The non-transitory computer-readable medium of claim 15, wherein the determining the list includes parsing the organizational file to locate a section indicating library dependency of the executable program.

* * * * *